Figure 9:
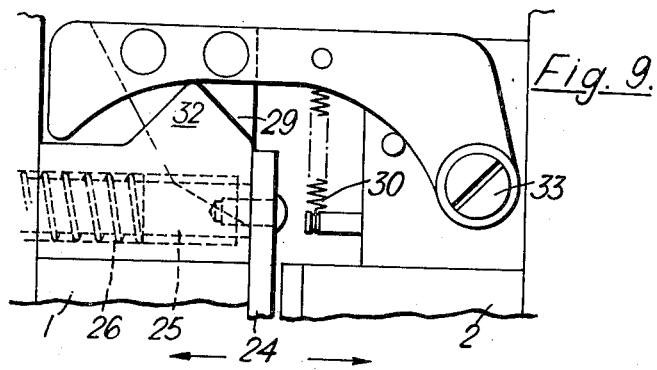

June 12, 1962 K. J. WHITBOURN 3,038,200
APPARATUS FOR FORMING AND TRIMMING HOLLOW ARTICLES
Filed Dec. 8, 1960 5 Sheets-Sheet 1
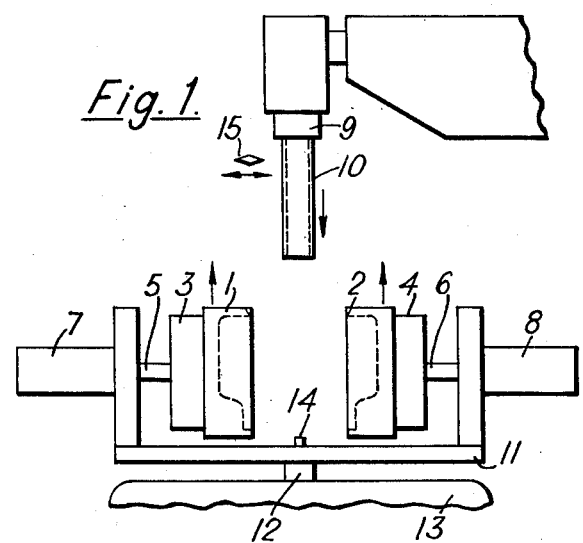
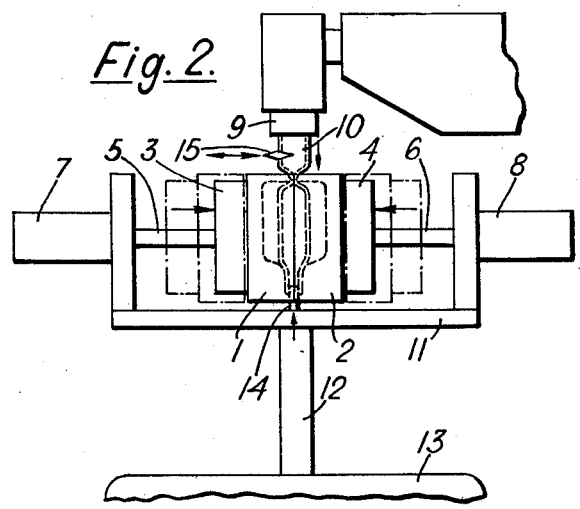
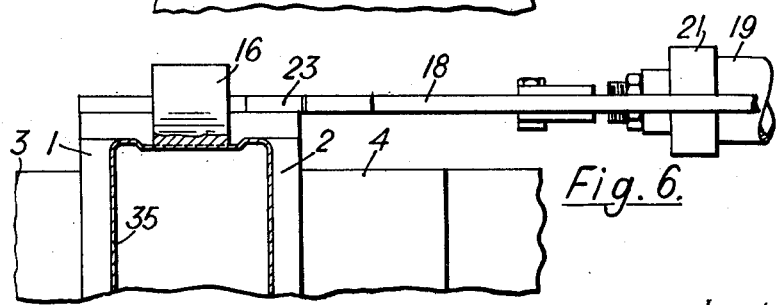
Inventor
KENNETH J. WHITBOURN
By Imirie & Smiley
Attorneys June 12, 1962 K. J. WHITBOURN 3,038,200
APPARATUS FOR FORMING AND TRIMMING HOLLOW ARTICLES
Filed Dec. 8, 1960 5 Sheets-Sheet 2
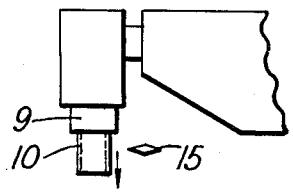
Fig. 3.
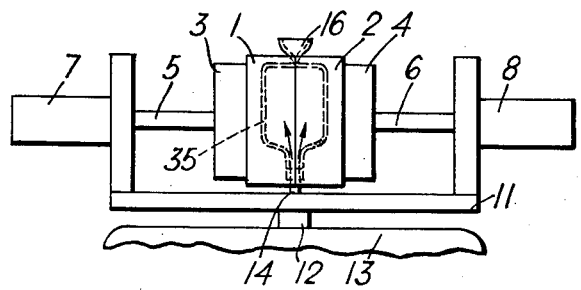
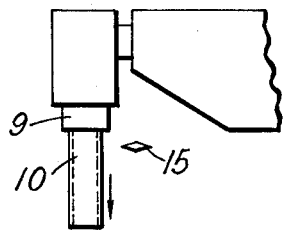
Fig. 4.
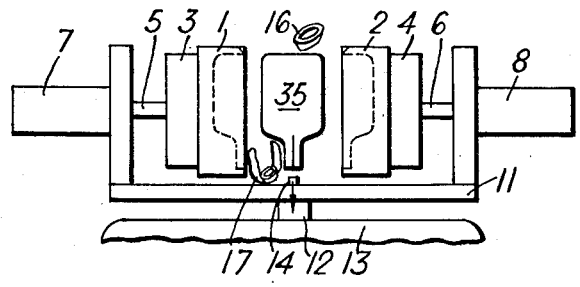
Inventor
KENNETH J. WHITBOURN
By *Emirie & Smiley*
Attorneys

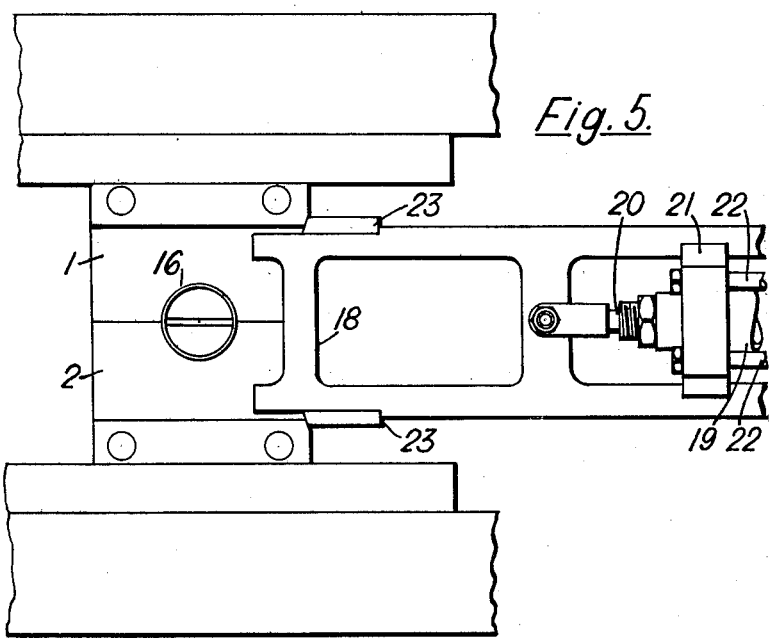
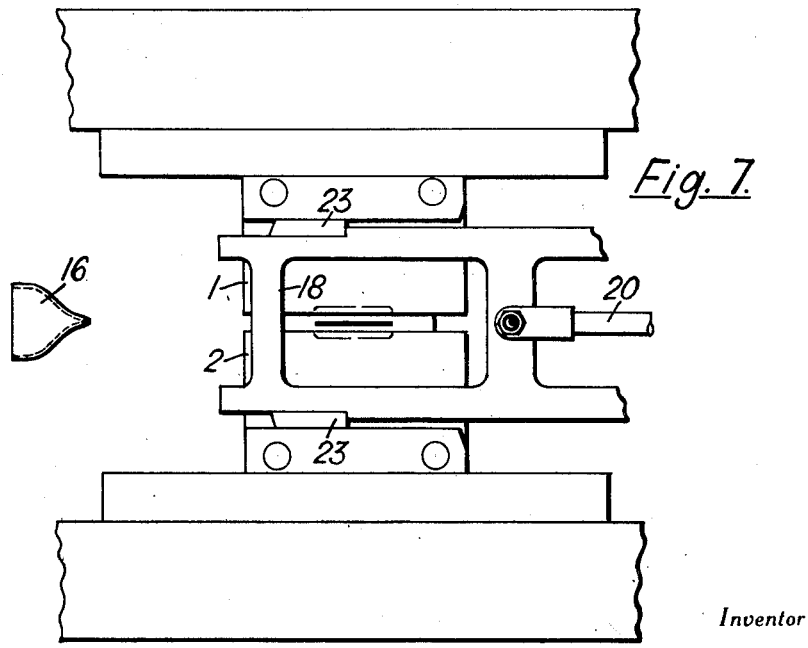

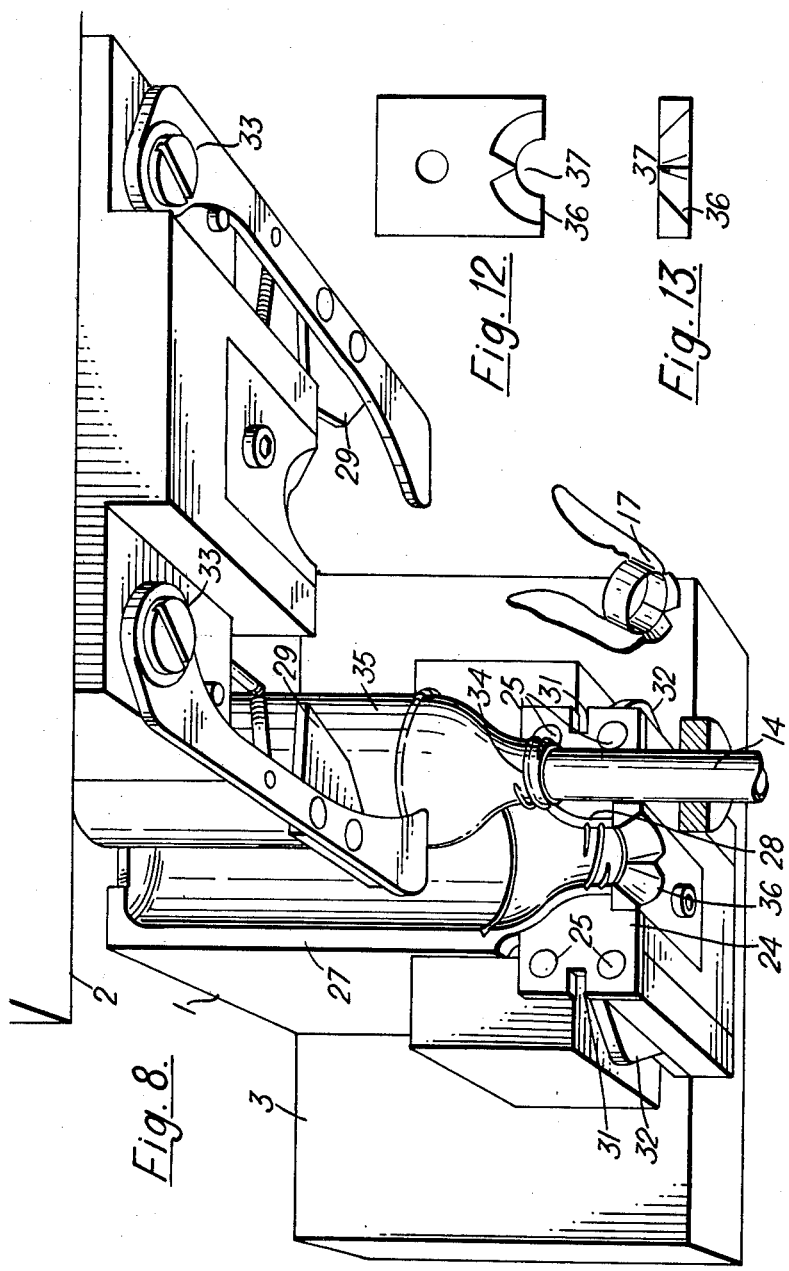

Inventor
KENNETH J. WHITBOURN

United States Patent Office 3,038,200
Patented June 12, 1962

3,038,200
APPARATUS FOR FORMING AND TRIMMING HOLLOW ARTICLES
Kenneth Joseph Whitbourn, Watford, England, assignor to The Metal Box Company Limited, London, England, a British company
Filed Dec. 8, 1960, Ser. No. 74,530
Claims priority, application Great Britain Dec. 21, 1959
12 Claims. (Cl. 18—5)

This invention relates to the manufacture of hollow articles, such as bottles, from thermoplastic materials such as polyethylene, cellulose esters, polyvinyl chloride, or polystyrene, hereinafter referred to as "plastic materials."

In currently employed methods of manufacturing bottles from plastic material a length of plastic tube is extruded from the extrusion nozzle of a plastic extrusion machine in a manner such that one end, either the leading or the trailing end, is disposed about a hollow mandrel about which the neck of the bottle is shaped. A sectional mould is closed about the extruded tube and the mandrel and fluid, usually air, under pressure is admitted through the mandrel to expand the enclosed tube length to the shape of the interior of the closed mould. After cooling, the mould is opened and the bottle is removed from the mandrel either by blowing into the bottle through the mandrel or by moving the mandrel axially thereof relative to the mould to withdraw the mandrel from the bottle neck.

When the mould is closed about the tube length the tube is squashed at the opposite ends thereof to form sprue, that is waste material, which extends respectively from the bottom of the bottle and diametrically from opposite sides of the neck of the bottle. Heretofore, the sprue has usually been removed manually following removal of the bottles from the mould and mandrel and it is a main object of the present invention automatically to effect removal of sprue before removal of a bottle from the mandrel thereby to reduce manual operations with consequent economy of labour costs.

Further according to the invention there is provided apparatus for use in forming hollow articles of plastic material, which apparatus includes a sectional mould adapted to surround a tube of softened plastic material with portions of the tube extending beyond the opposite ends of the closed mould, means to permit the admission of fluid under pressure into a tube thereby to expand the tube and conform it to the internal shape of the mould, and means operable in timed relation with the opening and closing of the mould to remove sprue from the article while the article is at least partly contained in the mould.

In order that the invention may be clearly understood one embodiment thereof will now be described, with reference to the accompanying drawings, in which:

FIGS. 1 to 4 illustrate diagrammatically the mode of operation of one kind of machine to which apparatus according to the invention can be applied, FIG. 5 is a top plan of apparatus according to the invention for removing bottom sprue from a bottle formed by the machine of FIGS. 1 to 4, FIG. 6 is an elevation of one mould section and of the apparatus of FIG. 5, FIG. 7 is a view similar to that of FIG. 5 but with some of the parts shown in different positions thereof.

Figure 10:
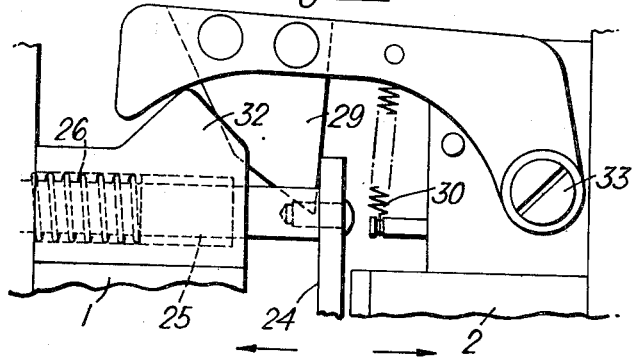
Figure 11:
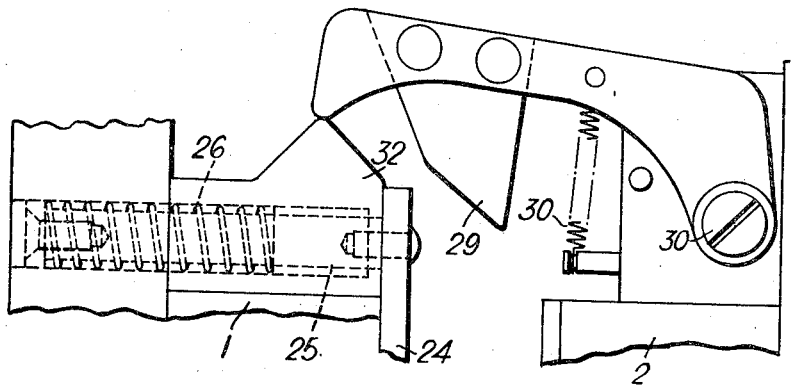

FIG. 8 is a pictorial view of the bottle-forming mould in the opened condition thereof and illustrates apparatus according to the invention for removing neck sprue from a bottle, FIGS. 9 to 11 illustrate the method of operation of the sprue-removing apparatus shown in FIG. 8, FIG. 12 is a plan view of one half of a cutter device which may be incorporated at the neck-forming end of the mould, and FIG. 13 is an elevation of FIG. 12.

Referring to FIGS. 1 to 4, these figures illustrate diagrammatically one known form of apparatus for forming bottles and to which sprue removing apparatus, described below, is to be fitted, the sprue removing apparatus is, however, not shown in these figures which are included in order that a brief description of the method of bottle forming may be given. The bottle forming apparatus comprises a sectional mould consisting of a first mould section 1 and a second mould section 2 supported by platens 3, 4 for movement towards and away from each other by the piston rods 5, 6 of pneumatic cylinders 7, 8, in known manner, to effect closing and opening of the mould. The mould is arranged to be located beneath the extrusion nozzle 9 of a plastic extrusion machine, the nozzle, in known manner, being arranged to effect the extrusion of a molten plastic tube 10. The mould sections 1, 2 are supported by a mould-carrying table 11 carried by hollow rods 12 which is supported for axial reciprocation in a base frame 13, reciprocation of the rod 12 and table 11 being effected in known manner so that the mould is movable towards and away from the extrusion nozzle 9. At the appropriate time in the operating cycle, the table, with the mould in the open condition thereof, and a hollow mandrel 14 which extends through rod 12, is raised to a position, FIG. 2, at which the mandrel 14 is located in the leading end of a length of tube 10 depending from the extrusion nozzle 9. The mould sections 1, 2 are then closed so that a length of tube of softened plastic material is surrounded thereby, the upper end of the tube being clamped between the upper edge portions of the mould while the lower end portion of the tube is clamped about the mandrel 14 by the lower edge portions of the mould with portions of the tube extending beyond the opposite ends of the closed mould. Just before the closed mould is caused to descend a reciprocable knife 15 operates to sever the upper end of the tube from the parent tube and air under pressure is admitted to the interior of the tube through the hollow mandrel 14. The air causes the tube to be expanded to conform it to the internal shape of the mould thereby to form the bottle, and after an interval, during which the formed bottle is cooled and set, the mould in the lowermost position thereof, FIG. 3, is opened, FIG. 4, to permit the bottle to be removed from the mould and from the mandrel.

As is well understood, when the mould is closed about a tube length an end portion of the tube is squashed and forms sprue 16, FIG. 3, which projects from the bottle bottom through the closed upper end of the mould and at the opposite end of the mould the projecting end portion of the tube is squashed to form neck sprue 17 which extends diametrically from opposite sides of the bottle neck, the neck sprue 17 being squashed between the closed lower edge portions of the mould.

According to the invention the sprue 16, 17 is removed automatically while the bottle is at least partly contained in the mould and this prevents the bottom sprue 16 from adhering to the bottle bottom as was sometimes the case prior to the invention, and also avoids the necessity of a manual operation to effect removal of the sprue following removal of the bottle from the mould. Accordingly, the bottles on removal from the mould are ready for the next processing operation and may, if desired, be delivered from the mould on to a conveyor for automatic conveyance thereby to such next operation.

Removal of the sprue from the bottom of the bottle is effected by a reciprocable element 18, FIGS. 5 to 7, such as a plate, which is supported for movement across the upper end of the mould, that is the end of the mould which is nearest the extrusion nozzle 9, and is in close relation therewith. The element 18 is supported by the table 11 for movement with the table and for reciprocation in a direction at right angles to the direction of movement of the mould sections 1, 2 during opening and closing thereof so that the bottom sprue 16 is engaged endwise by the element and is removed by a pushing action which, as illustrated in FIGS. 5 and 7, is exerted against a narrow end of the flattened part of the sprue 16.

Movement of the reciprocable element 18 is effected at a high velocity to ensure that the sprue 16 is ejected clear of the mould and that the element 18 is restored to the datum position thereof as quickly as possible to ensure that it is clear of the next tube section which is issuing from the extrusion nozzle. Operation of the reciprocable element 18 is effected by actuating means comprising an air cylinder 19 including a piston rod 20 connected to the reciprocable element. The element 18 is guided for reciprocation by co-operation with guides 21 supported by fixed rods 22, FIG. 5.

The air cylinder 19 is actuated in timed relation with the opening and closing of the mould sections 1, 2 and in order that the reciprocating element 18 may be caused to "fly" across the mould to effect removal of bottom sprue 16 the air cylinder commences operation while stops 23 carried by the reciprocable element 18 are engaged with the closed mould sections, FIGS. 5 and 6. The element 18 is thus constrained by the mould and pressure builds up in the cylinder 19. As the mould opens it suddenly releases the element 18 so that the build-up pressure is suddenly released and causes the element to "fly" over the upper end of the mould and to engage the sprue with an impact such as to ensure that the sprue is removed from the bottle bottom, while the bottle is still partly contained in the mould, and is impelled clear of the mould, FIG. 7.

If the mould is in good condition it may be possible to effect operation of the reciprocable element 18 at a reduced velocity so that the sprue 16 is removed by the said element with a pushing action.

Automatic removal of the neck sprue 17 is effected by a stripper element 24 (FIGS. 8 to 11) which is supported for movement with a first mould section 1 and relative to said section 1 in the direction of movement thereof. To this end the stripper element 24 is mounted at the ends of rods 25 which extend through the mould section 1 and are provided with springs 26, FIGS. 9 to 11, which urge the stripper element 24 to a datum position thereof in which a face of the element is located in the plane of the face 27, FIG. 8, of the first mould section 1 which is engaged by the face of the second mould section 2 when the sections are in the closed condition thereof. The stripper element 24 is also adapted, as at 28, FIG. 8, to conform to the shape of the mandrel so that when the mould is closed about a tube length the neck sprue 17 is moulded between the stripper element 24 and the face of the second mould section.

Operating means which co-operate with the stripper element 24 consist of a pair of latches 29 pivotally mounted on the second mould section 2 and which are urged by springs 30 to datum positions thereof in which they can be engaged behind the stripper element 24 when the mould is closed. The stripper element 24 is provided with slots or openings 31, FIG. 8, through which the latches 29 pass as the mould sections are moved to the closed condition thereof and the first mould section 1 has cams 32 movable therewith and which co-operate with the latches 29 to effect rocking thereof about the pivots 33 therefor against the action of the latch springs 30. Thus as the mould is closed the latches 29 are passed through the slots 31 in the stripper element 24, are opened, and are then caused to close behind the stripper plate 24.

On re-opening of the mould the latches 29, being engaged behind the stripped element 24, FIG. 10, cause the stripper element 24 to follow movement of the second mould section 2 during the initial opening movement thereof thus, while the bottle is still partly contained in the mould, causing the sprue 17 to be removed from the neck 34, FIG. 8, of the bottle 35 which is still located about the mandrel 14. When the cams 32 carried by the first mould section 1 release the latches 29, FIG. 11, the springs 26 cause the element 24 to return sharply to the datum position thereof, FIG. 11.

To facilitate the removal of the neck sprue 17 the mould sections 1, 2 may be provided with circumferential cutters 36, FIGS. 12 and 13 which co-operate with the mandrel 14 during closing of the mould sections 1, 2 to form in the tube portion located around the mandrel an area of weakening about which separation of the sprue 17 is effected by the action of the stripper element 24 as described above. The circumferential cutter 36 which is provided in the first mould section 1 is also fitted with a secondary cutter 37, the cutting edge of which is substantially parallel to the axis of the mandrel 14. The secondary cutter 37 is arranged, during closing of the mould, to co-operate with the mandrel 14 to effect a weakening of the sprue 17 lengthwise of the mandrel.

Although in the foregoing description the invention has been described with specific reference to the formation of a bottle in the upside down condition thereof, it is to be understood that the method and apparatus herein described can be modified to effect the automatic removal of sprue from bottles formed in the upright position thereof.

I claim:

1. Apparatus for use in forming hollow articles of plastic material, including a sectional mould operable to enclose a tube of softened plastic material with portions of the tube extending beyond the opposite ends of the closed mould and forming sprue, means co-operating with the mould to permit the admission of fluid under pressure into the tube thereby to expand the tube and conform it to the internal shape of the mould, a reciprocable element supported for movement in a direction at right-angles to the direction in which the mould sections are movable during opening and closing of the mould and for movement across and in close proximity to the closed end of the mould from which the article bottom sprue projects, and actuating means operable in timed relation with the opening and closing of the mould to effect operation of the reciprocable element thereby to remove said bottom sprue while the article is at least partly contained in the mould, said actuating means including stops carried by said element and engageable with the closed mould and pressure-exerting means operable to build up an actuating pressure while said stops are constrained by the mould and to cause said element to fly forward to effect removal of the bottom sprue when the mould sections are opened to an extent such as to release the constraint applied thereby to the stops.

2. Apparatus for use in forming bottles of plastic material, including a sectional mould operable to enclose a tube of softened plastic material with portions of the tube extending beyond the opposite ends of the closed mould respectively to form bottom sprue and neck sprue, means co-operating with the mould to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, and operating means co-operating with the stripper element to cause said element to follow the second mould section during initial opening of the mould thereby to remove the neck sprue from the bottle contained in the partly opened mould and then to release it to permit it to return to the datum position thereof relative to the first mould section.

3. Apparatus for use in forming bottles of plastic material, including a sectional mould operable to enclose a tube of softened plastic material with portions of the tube extending beyond the opposite ends of the closed mould respectively to form bottom spru and neck sprue, means co-operating with the mould to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, latches pivoted on said second mould section and spring-urged to datum positions thereof in which the latches are engaged behind the stripper element in the closed condition of the mould, and cams movable with said first mould section and co-operating with said latches to effect pivotal movement of the latches away from the datum positions thereof thereby to control engagement and disengagement of the latches with the stripper element so that during initial opening of the mould the stripper element follows said second mould section to effect removal of the neck sprue and is then released by said latches and is returned by said springs to the datum position thereof relative to the first mould section.

4. Apparatus for use in forming bottles of plastic material, including a sectional mould operable to encolse a tube of softened plastic material with portions of the tube extending beyond the opposite ends of the closed mould respectively to form bottom sprue and neck sprue, means co-operating with the mould to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, operating means co-operating with the stripper element to cause said element to follow the second mould section during initial opening of the mould thereby to remove the neck sprue from the bottle contained in the partly opened mould and then to release it to permit it to return to the datum position thereof relative to the first mould section, a reciprocable element supported for movement across and in close relation to the closed end of the mould from which the bottom sprue projects, and actuating means operable in timed relation with the opening and closing of the mould to effect operation of the reciprocable element thereby to remove said bottom sprue while the bottle is at least partly contained in the mould.

5. Apparatus for use in forming bottles of plastic material including a sectional mould operable to enclose a tube of softened plastic material with portions of the tube extending beyond the opposite ends of the closed mould respectively to form bottom sprue and neck sprue, means co-operating with the mould to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, operating means co-operating with the stripper element to cause said element to follow the second mould section during initial opening of the mould thereby to remove the neck sprue from the bottle contained in the partly opened mould and then to release it to permit it to return to the datum position thereof relative to the first mould section, a reciprocable element supported for movement in a direction at right angles to the direction in which the mould sections are movable during opening and closing of the mould and for movement across and in close proximity to the closed end of the mould from which the bottom sprue projects, and actuating means operable in timed relation with the opening and closing of the mould to effect operation of the reciprocable element thereby to remove said bottom sprue while the bottle is at least partly contained in the mould.

6. Apparatus for use in forming bottles of plastic material, including a sectional mould operable to enclose a tube of softened plastic material with portions of the tube extending beyond the opposite ends of the closed mould respectively to form bottom sprue and neck sprue, means co-operating with the mound to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, operating means co-operating with the stripper element to cause said element to follow the second mould section during initial opening of the mould thereby to remove the neck sprue from the bottle contained in the partly opened mould and then to release it to permit it to return to the datum position thereof relative to the first mould section, a reciprocable element supported for movement in a direction at right angles to the direction in which the mould sections are movable during opening and closing of the mould and for movement across and in close proximity to the closed end of the mould from which the bottom sprue projects, and actuating means operable in timed relation with the opening and closing of the mould to effect operation of the reciprocable element thereby to remove said bottom sprue while the bottle is at least partly contained in the mould, said actuating means including stops carried by said element and engageable with the closed mould and pressure-exerting means operable to build up an actuating pressure while said stops are constrained by the mould and to cause said element to fly forward to effect removal of the bottom sprue when the mould sections are opened to an extent such as to release the constraint applied thereby to the stops.

7. Apparatus for use in forming bottles of plastic material, including a sectional mould operable to enclose a tube of softened plastic material with portions of the tube extending beyond the opposite ends of the closed mould respectively to form bottom sprue and neck sprue, means co-operating with the mould to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, latches pivoted on said second mould section and spring-urged to datum positions thereof in which the latches are engaged behind the stripper element in the closed condition of the mould, cams movable with said first mould section and co-operating with said latches to effect pivotal movement of the latches away from the datum positions thereof thereby to control engagement and disengagement of the latches with the stripper element so that during initial opening of the mould the stripper element follows said second mould section to effect removal of the neck sprue and is then released by said latches and is returned by said springs to the datum position thereof relative to the first mould section, a reciprocable element supported for movement across and in close relation to the closed end of the mould from which the bottom sprue projects, and actuating means operable in timed relation with the opening and closing of the mould to effect operation of the reciprocable element thereby to remove said bottom sprue while the bottle is at least partly contained in the mould.

8. Apparatus for use in forming bottles of plastic material, including a sectional mould operable to enclose a tube of softened plastic material with portions of the tube extending beyond the opposite ends of the closed mould respectively to form bottom sprue and neck sprue, means co-operating with the mould to permit the admission of fluid under pressure into the tube thereby to expand the tube and conform it to the internal shape of the mould, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, latches pivoted on said second mould section and spring-urged to datum positions thereof in which the latches are engaged behind the stripper element in the closed condition of the mould, cams movable with said first mould section and co-operating with said latches to effect pivotal movement of the latches away from the datum positions thereof thereby to control engagement and disengagement of the latches with the stripper element so that during initial opening of the mould the stripper element follows said second mould section to effect removal of the neck sprue and is then released by said latches and is returned by said springs to the datum position thereof relative to the first mould section, a reciprocable element supported for movement across and in close relation to the closed end of the mould from which the bottom sprue projects, and actuating means operable in timed relation with the opening and closing of the mould to effect operation of the reciprocable element thereby to remove said bottom sprue while the bottle is at least partly contained in the mould, said actuating means including stops carried by said element and engageable with the closed mould and pressure-exerting means operable to build up an actuating pressure while said stops are constrained by the mould and to cause said element to fly forward to effect removal of the bottom sprue when the mould sections are opened to an extent such as to release the constraint applied thereby to the stops.

9. Apparatus for use in forming bottles of plastic material, including a sectional mould operable to enclose a tube of softened plastic material with portions of the tube extending beyond the opposite ends of the closed mould respectively to form bottom sprue and neck sprue, a hollow mandrel locatable in the neck-forming end of the tube to permit fluid under pressure to be admitted to the tube to expand the tube to the internal shape of the closed mould, circumferential cutters carried by said mould sections to co-operate with said mandrel and define an area of weakening in the neck sprue, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, and operating means co-operating with the stripper element to cause said element to follow the second mould section during initial opening of the mould thereby to remove the neck sprue about said area of weakening while the bottle is partly contained in the mould and then to release said element to permit it to return to the datum position thereof relative to the first mould section.

10. Apparatus for use in forming bottles of plastic material, including a sectional mould operable to enclose a tube of softened plastic material with portions of the tube extending beyond the opposite ends of the closed mould respectively to form bottom sprue and neck sprue, a hollow mandrel locatable in the neck-forming end of the tube to permit fluid under pressure to be admitted to the tube to expand the tube to the internal shape of the closed mould, circumferential cutters carried by said mould sections to co-operate with said mandrel and define an area of weakening in the neck sprue, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, a secondary cutter co-operating with the circumferential cutter carried by the first mould section, said secondary cutter being also carried by the first mold section and having its cutting edge substantially parallel to the axis of said mandrel to co-operate with the mandrel in forming a weakening of the neck sprue lengthwise of the mandrel.

11. Apparatus for use in forming bottles of plastic material, including a sectional mould operable to enclose a tube of softened plastic material with portions of the tube extending beyond the opposite ends of the closed mould respectively to form bottom sprue and neck sprue, a hollow mandrel locatable in the neck-forming end of the tube to permit fluid under pressure to be admitted to the tube to expand the tube to the internal shape of the closed mould, circumferential cutters carried by said mould sections to co-operate with said mandrel and define an area of weakening in the neck sprue, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, operating means co-operating with the stripper element to cause said element to follow the second mould section during initial opening of the mould thereby to remove the neck sprue about said area of weakening while the bottle is partly contained in the mould and then to release said element to permit it to return to the datum position thereof relative to the first mould section, a reiprocable element supported for movement in a directional at right angles to the direction in which the mould sections are movable during opening and closing of the mould and for movement across and in close proximity to the closed end of the mould from which the bottom sprue projects, and actuating means operation timed relation with the opening and closing of the mould to effect operation of the reciprocable element thereby to remove said bottom sprue while the bottle is at least partly contained in the mould.

12. Apparatus for use in forming bottles of plastic material, including a sectional mould operable to enclose a tube of softened plastic material with portions of the tube extending beyond the opposite ends of the closed mould respectively to form bottom sprue and neck sprue, a hollow mandrel locatable in the neck-forming end of the tube to permit fluid under pressure to be admitted to the tube to expand the tube to the internal shape of the closed mould, circumferential cutters carried by said mould sections to co-operate with said mandrel and define an area of weakening in the neck sprue, a stripper element supported for movement with a first mould section and relative to said mould section in the direction of movement of the section, springs urging the stripper element to a datum position thereof relative to the first mould section and in which position the stripper element co-operates with a second mould section to permit moulding of the neck sprue between said element and second section, operating means co-operating with the stripper element to cause said element to follow the second mould section during initial opening of the mould thereby to remove the neck sprue about said area of weakening while the bottle is partly contained in the mould and then to release said element to permit it to return to the datum position thereof relative to the first mould section, a reciprocable element supported for movement in a direction at right angles to the direction in which the mould sections are movable during opening and closing of the mould and for movement across and in close proximity to the closed end of the mould from which the bottom sprue projects, and actuating means operable in timed relation with the opening and closing of the mould to effect operation of the reciprocable element thereby to remove said bottom sprue while the bottle is at least partly contained in the mould, said actuating means including stops carried by said element and engageable with the closed mould and pressure-exerting means operable to build up an actuating pressure while said stops are constrained by the mould and to cause said element to fly forward to effect removal of the bottom sprue when the mould sections are opened to an extent such as to release the constraint applied thereby to the stops.

References Cited in the file of this patent

UNITED STATES PATENTS

| | | |
|---|---|---|
| 2,890,483 | Soubier | June 16, 1959 |
| 2,928,120 | Leghorn et al. | Mar. 15, 1960 |
| 2,943,349 | Adams et al. | July 5, 1960 |
| 2,975,471 | Sherman | Mar. 21, 1961 |